United States Patent [19]
Paterson et al.

[11] 4,067,518
[45] Jan. 10, 1978

[54] DRAG REDUCER FOR LIFT SURFACE OF AIRCRAFT

[75] Inventors: John Howard Paterson, Atlanta; Francis Marion Wilson, Jr., Marietta, both of Ga.

[73] Assignee: Lockheed Corporation, Burbank, Calif.

[21] Appl. No.: 688,135

[22] Filed: May 20, 1976

[51] Int. Cl.² ............................................. B64C 1/38
[52] U.S. Cl. .................................... 244/130; 244/198; 244/200
[58] Field of Search .................... 244/40 R, 40 A, 41, 244/130, 198, 200; 416/228, 223 R, 231, 235, 236 R, 236 A

[56] References Cited
U.S. PATENT DOCUMENTS 2,950,879  8/1960  Smith ..................................... 244/41
2,967,030  1/1961  Whitcomb ........................... 244/130

FOREIGN PATENT DOCUMENTS 681,633  5/1930  France .................................... 244/41
190,506  12/1922  United Kingdom .................... 244/41

Primary Examiner—George E. A. Halvosa
Assistant Examiner—Charles E. Frankfort
Attorney, Agent, or Firm—Billy G. Corber; John J. Sullivan

[57] ABSTRACT

One or more aerodynamic bodies of preselected shape and placement are employed on the lower surface of an aircraft wing or other aerodynamic lifting surface for the purpose of reducing its drag. These anti-drag bodies singly or collectively provide a reduction in the lower speed profile drag of the associated lifting surface, an increase in its lift at a given angle of attack, and an increase in its critical Mach number.

6 Claims, 4 Drawing Figures

DRAG REDUCER FOR LIFT SURFACE OF AIRCRAFT

This invention relates generally to lifting surfaces employed on aircraft and more particularly to an especially arranged and configured addition to the exterior of such surfaces which reduces the profile drag of these surfaces. At the same time the lift created by such surfaces is increased at all angles of attack.

It is well known that aeronautical lift surfaces, such as wings, experience considerably greater boundary layer air growth on their upper side than on their under side. On many if not most wings the aft stagnation point in cruise is actually located on the upper surface several percent (on the order of 2% to 5%) of the chord forward of the trailing edge. Thus, the wing upper surface boundary layer air build-up is the major contributor to the wing's wetted area or profile drag.

Prior attempts to alleviate such drag have resulted in additive devices or mechanisms which require special attention and maintenance, involve moving parts and/or demand power, usually drawn from existing, onboard sources. Generally, such prior art schemes are based on and include apparatus to produce suction of the boundary layer air over the upper surface. Also, compliant skin has been suggested which attempts to so design the skin of the major aircraft components as to cause it to react to the onset of boundary layer air turbulence and thereby reduce its rate of building (in thickness) on the surface.

The present invention offers a different approach to the high drag and low lift problem. At the same time this invention envisions a solution to the problem which recognizes the fact that the aircraft wings and other major lifting components serve other, secondary purposes in the operation of the vehicle. Thus, the addition i.e., the attachment or attachments herein proposed are so made and located as to provide drag free volume for such tactical equipment as, external stores including weapons, fuel tanks, refueling pods etc., or other components such as external flap support structure and the like.

More specifically, the drag reducing and lift increasing addition or attachment of the instant invention comprises one or more aerodynamic members or bodies configured to reduce the drag of a lifting surface, such as a wing, by decreasing its trailing edge boundary layer air thickness. It also increases the lift of the surface or wing at a given angle of attack and may through selective spanwise placement reduce the wing's bending moments at any given net lift.

To this end each aerodynamic body is mounted on the wing or surface trailing edge with its maximum cross section located approximately at the trailing edge. Substantially all of each body's cross section is located below the wing lower surface chord plane extended.

Thus disposed, each aerodynamic body, it has been found, acts to create a strong negative pressure at the wing's trailing edge. This pressure field provides suction of the adjacent upper surface boundary layer air thereby reducing its depth and hence wing drag. The boundary layer air sucked off the wing upper surface is dissipated off the trailing surface of each aerodynamic body.

In addition, the reduction in the upper surface boundary layer air thickness as well as the effect of the added cross sectional area on the wing lower surface trailing edge acts to produce added wing lift at a given angle of attack. It also results in an increased wing critical Mach number at a given lift coefficient.

It is noted that there are certain superficial similarities between the features of this invention and those of Dr. Whitcomb's anti-shock bodies U.S. Pat. No. 2,967,030 issued Jan. 3, 1961). The Whitcomb anti-shock bodies are located on the upper surface of a wing and act to reduce the peak local Mach numbers of such wing. This, in turn, increases the wing critical Mach number, hence reduces its wave drag at all airspeeds above the critical Mach number of the basic wing. Their purported effect, therefore, is on the total wing flow field to reduce local shock strength, rather than to act directly on the wing boundary layer. However, the anti-shock bodies increase the wing's low speed drag, e.g., skin friction and profile drag. They also cause an appreciable lift loss at all angles of attack.

The anti-drag bodies of the present invention are mounted on the wing lower surface and act to decrease those drag components which are adversely affected by the anti-shock bodies. This favorable effect has been attributed to pressures induced on the bodies themselves which act to provide wing boundary layer trailing edge suction. This suction thins the boundary layer locally, particularly on the wing upper surface, and thus increases the effective camber of the wing. This increase in camber reduces the wing angle of attack required to generate a given lift, thereby reducing the lift-dependent profile drag of the airplane at all Mach numbers. These anti-drag bodies therefore yield a drag reduction at all Mach numbers but do not act directly to reduce shock strength as do the Whitcomb anti-shock bodies. Their effect is dependent upon a very careful shaping of each aerodynamic body as hereinafter described.

With the above and other objects in view as will be apparent, this invention consists in the construction, arrangement and combination of parts all as hereinafter more fully disclosed, claimed and illustrated in the accompanying drawings, wherein:

Figure 1:
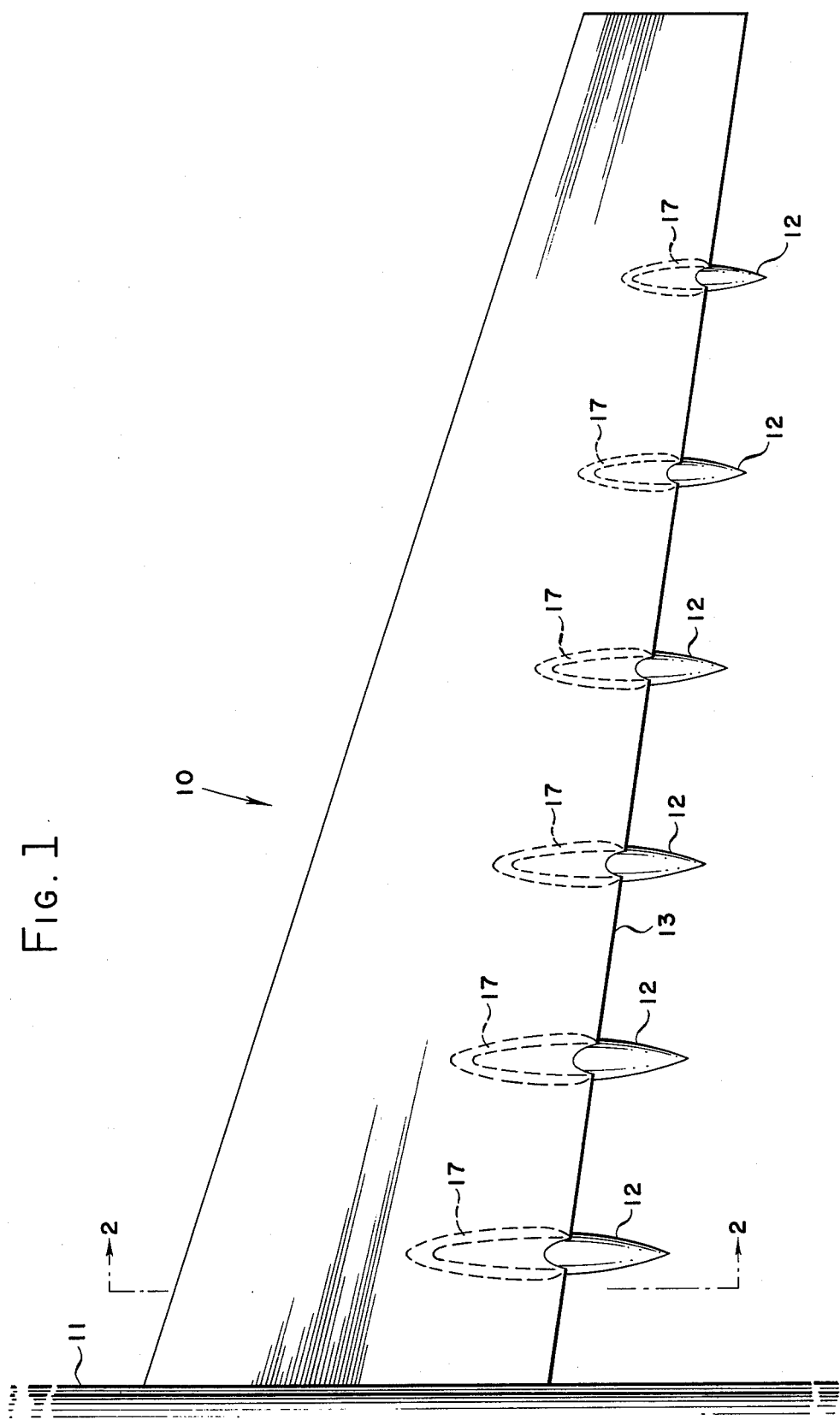
FIG. 1 is a plan view of an airplane wing and the associated portion of the nacelle or fuselage to show the combination therewith of a plurality of aerodynamic bodies of preferred configuration as envisioned by the instant invention.
Figure 2:
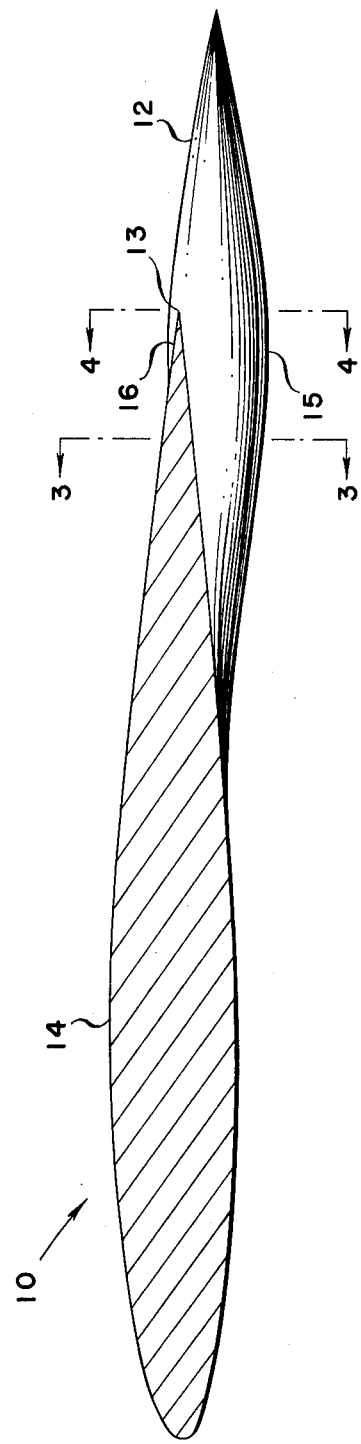
FIG. 2 is a section taken along line 2-2 of FIG. 1 to show the transverse dimension of the airplane wing and the relative longitudinal dimension and location of each aerodynamic body.
Figure 4:
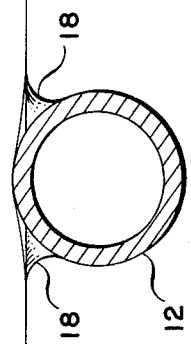
FIG. 4 is a section taken along line 4—4 of FIG. 2.
Figure 3:
FIG. 3 is a section taken along line 3—3 of FIG. 2.

Referring more particularly to the drawings, 10 designates a lift surface of an airplane such as for example fixed wing connected to and extending outwardly from a nacelle or fuselage 11. Mounted in any conventional manner on the under side of the wing 10 so as to form, in effect, an integral part thereof is a plurality of aerodynamically contoured member or bodies 12. By "aerodynamically contoured" is meant substantially pointed at its forward and rear ends with a gradually enlarged mid-section thereby defining an external surface which is streamlined, smooth, and free of any discontinuity.

The location of each of these members 12 is critical to the extent that it extends aft of the trailing edge 13 of the wing 10. Preferably, the forward end or nose of each member 12 is located proximate but aft of the point 14 of maximum thickness of the wing 10 with the maximum cross section 15 of each member 12 substantially at the trailing edge 13.

While the cross sectional shape of each member 12 may be oval it is preferred circular at each point in its length but in any case the maximum transverse dimension of each member 12 is 0.08 to 0.10 of the local wing chord. At the same time the aft portion of each member 12, i.e., the portion aft of the wing trailing edge 13, is about three times the maximum transverse dimension of that member 12.

As presently envisioned the trailing edge 13 of the wing 10 remains intact and the body 12 is notched as at 16 on its upper side to receive the trailing edge portion of the wing 10 in flush abutment. Thus disposed the body 12 is immovably secured, as for example by bonding at and along the entire faying surfaces as indicated at 17. For all intents and purposes the body 12 becomes an integral part of the wing 10.

The several members 12 are most effective when disposed apart in a spanwise direction approximately four to six times their maximum transverse dimension. Fillets 18 shaped in accordance with conventional aerodynamic practice are provided at the intersections of each member 12 and the adjacent surface of the wing 10.

While the invention has been hereinabove illustrated and described in what is believed to be its best and most practical form under present-day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. A drag reducer for a lift surface of an aircraft comprising at least one member secured to the under side of said lift surface with its long dimension disposed substantially chordwise of said lift surface to thereby lie parallel with the line of flight of said aircraft, each said member being substantially circular in cross-section at each point in its length and substantially pointed at its forward and rear ends with a gradually enlarged mid-section thereby defining an external surface which is streamlined, smooth and free of any discontinuity, the rear extremity of each said member extending aft of the trailing edge of said lift surface a distance equal to about three times the maximum transverse dimension of said member which is preselected to be between 0.08 and 0.10 of the length of the chord of said lift surface at that chordwise location and disposed substantially at the trailing edge of said lift surface.

2. The invention of claim 1 wherein a plurality of said members are employed spanwise of said lift surface each spaced from the next a distance equal to approximately four to six times the maximum transverse dimension of said members.

3. The invention of claim 2 wherein said lift surface is a fixed wing and there are six members.

4. The invention of claim 1 including a fillet disposed at the intersections of each said member and said lift surface.

5. The invention of claim 1 wherein the forward extremity of each said member is located proximate but aft of the point of maximum thickness of said lift surface.

6. The invention of claim 1 wherein each said member is notched on its upper side to receive the lift surface trailing edge aforesaid in flush face to face abutment and secured thereto by bonding at and along said abutment.

* * * * *